(12) United States Patent
Feng et al.

(10) Patent No.: US 12,399,085 B1
(45) Date of Patent: Aug. 26, 2025

(54) DETECTION DEVICE FOR STEAM TURBINE BLADE

(71) Applicant: HUANENG SHANTOU HAIMEN POWER GENERATION CO., LTD, Shantou (CN)

(72) Inventors: Tingyou Feng, Shantou (CN); Hongjin Li, Shantou (CN); Liang You, Shantou (CN); Chuangwei Zheng, Shantou (CN); Chenliang Zhu, Shantou (CN); Zexiong Zhang, Shantou (CN); Cunrui Guo, Shantou (CN); Chaoping Tang, Shantou (CN); Zhenhai Wu, Shantou (CN); Jiehong Ji, Shantou (CN); Shuo Wang, Shantou (CN)

(73) Assignee: HUANENG SHANTOU HAIMEN POWER GENERATION CO., LTD, Shantou (CN)

( * ) Notice: Subject to any disclaimer, the term of this patent is extended or adjusted under 35 U.S.C. 154(b) by 0 days.

(21) Appl. No.: 19/230,006

(22) Filed: Jun. 5, 2025

(30) Foreign Application Priority Data

Jun. 25, 2024 (CN) .......................... 202410831453.2

(51) Int. Cl.
G01M 15/14 (2006.01)
(52) U.S. Cl.
CPC .................................... G01M 15/14 (2013.01)
(58) Field of Classification Search
CPC ..................................................... G01M 15/14
See application file for complete search history.

(56) References Cited

U.S. PATENT DOCUMENTS

| 4,922,757 A | * | 5/1990 | Rozelle | ................... F01D 21/04 416/61 |
| 5,791,147 A | * | 8/1998 | Earley | ..................... F22D 1/325 60/657 |

(Continued)

FOREIGN PATENT DOCUMENTS

| CN | 208937540 U | 6/2019 |
| CN | 112858327 A | 5/2021 |

(Continued)

OTHER PUBLICATIONS

CN 221066049 U to Luo, Yang; Issued Jun. 4, 2024, English translation, pp. 1-12.

(Continued)

*Primary Examiner* — Eric S. McCall
(74) *Attorney, Agent, or Firm* — Addison D. Ault; IPGentleman Intellectual Property Services, LLC

(57) ABSTRACT

A detection device for steam turbine blades is provided, and relates to the technical field of steam turbine blade detection, and includes a mounting plate, a driving mechanism is fixedly mounted on a top of the mounting plate, a clamping mechanism is fixedly mounted on the driving mechanism, and a detection mechanism is mounted on one side of the top of the mounting plate through a mounting bracket. The driving mechanism installed on the mounting plate drives the clamping mechanism to fix the steam turbine impellers, and meanwhile, the blades to be detected on the steam turbine impellers are detected one by one in cooperation with the detection mechanism 4 installed on the mounting plate through the mounting bracket.

9 Claims, 6 Drawing Sheets

(56) References Cited

U.S. PATENT DOCUMENTS

2020/0096384 A1\* 3/2020 Saburi .................. F01D 21/003
2022/0018263 A1\* 1/2022 Seo ........................ F01D 25/10

FOREIGN PATENT DOCUMENTS

| CN | 217255659 U | 8/2022 |
| CN | 219925221 U | 10/2023 |
| CN | 221066049 U | 6/2024 |
| WO | 2022/116249 A1 | 9/2022 |

OTHER PUBLICATIONS

CN 219925221 U to Wang, Hao; Issued Oct. 31, 2023, English translation, pp. 1-12.
CN 217255659 U to Liu, Gaopan; Issued Aug. 23, 2022, English translation, pp. 1-10.
CN 208937540 U to Kong, Biao; Issued Jun. 4, 2019, English translation, pp. 1-15.
CN 112858327 A to Li, Zhiwei; Issued May 28, 2021, English translation, pp. 1-12.
CNIPA Office Action, Application No. 202410831453.2 dated Oct. 16, 2024, Original Chinese pp. 1-12.
CNIPA Office Action, Application No. 202410831453.2 dated Oct. 16, 2024, English translation, pp. 1-9.

\* cited by examiner

DETECTION DEVICE FOR STEAM TURBINE BLADE

CROSS-REFERENCE TO RELATED APPLICATIONS

This application claims priority of Chinese Patent Application No. 202410831453.2, filed on Jun. 25, 2024, the content of which is hereby incorporated by reference.

TECHNICAL FIELD

The disclosure relates to the technical field of steam turbine blade detection, and in particular to a detection device for steam turbine blades.

BACKGROUND

The steam turbine blades are important components that convert the energy of high-temperature and high-pressure steam into mechanical energy. They are subjected to high temperature, high pressure, huge centrifugal force, steam force, steam excitation force, corrosion and vibration. The aerodynamic performance, machining geometry, surface roughness, installation clearance and operating conditions of blades have significant effects on the efficiency and output of steam turbines. Therefore, the detection of blades in use is very important for the overall performance of steam turbines.

With the large-scale use of steam turbines, there are differences in the shape and size of steam turbine blades on the market at present, which makes it difficult to fix most steam turbine blades during inspection, and it is impossible to fix quickly according to the actual specifications of the blades. Moreover, it is impossible to detect the blades on the whole impeller stably and efficiently. Therefore, a detection device for steam turbine blades is proposed to solve the above problems.

SUMMARY

A detection device for steam turbine blades is provided, and is used for solving at least one of the problems raised in the above background technology.

In order to solve the technical problems, a detection device for steam turbine blades is provided, and includes a mounting plate, where a driving mechanism is fixedly mounted on a top of the mounting plate, a clamping mechanism is fixedly mounted on the driving mechanism, and a detection mechanism is mounted on one side of the top of the mounting plate through a mounting bracket.

Preferably, multiple universal wheels are fixedly installed on a peripheral side of a bottom of the mounting plate.

Preferably, the driving mechanism includes two supporting plates, the two supporting plates are respectively fixedly connected to left and right sides of the top of the mounting plate, and a forward and reverse driving motor is fixedly installed on a right side wall of the mounting plate through a mounting seat, one end of a first threaded rod with opposite left and right rotation directions rotatably penetrates the supporting plate and is fixedly connected with an output shaft of the forward and reverse driving motor, and an other end of the first threaded rod is rotatably connected with an inner wall, close to a left side of the mounting plate, of the supporting plate, and two threaded sliding sleeves are threadedly connected on the first threaded rod at left and right intervals, and the two threaded sliding sleeves are threadedly connected on threaded sections with opposite rotation directions respectively.

Preferably, the clamping mechanism includes two slide rails, the two slide rails are fixedly installed at the top of the mounting plate at front and rear intervals, and a bottom of a first clamping plate is slidably connected to left sides of the two slide rails through two first sliders, a bottom of a second clamping plate is slidably connected to right sides of the two slide rails through two second sliders; bottoms of the first clamping plate and the second clamping plate are fixedly connected with tops of the two threaded sliding sleeves respectively in one-to-one correspondence; and two clamping assemblies are respectively embedded in grooves of the first clamping plate and the second clamping plate, and an adjusting assembly is arranged in a groove of the second clamping plate, and the adjusting assembly is used for driving a clamping assembly in the second clamping plate.

Preferably, the clamping assembly includes a mounting slip ring, the mounting slip ring is rollingly connected in the groove on the second clamping plate, fixed ends of multiple first electric telescopic rods are fixedly connected along a circumferential interval of an inner wall of the mounting slip ring, and telescopic ends of multiple first electric telescopic rods are fixedly connected with arc plates, and inner walls of the arc plates are in contact connection with the first rotating shaft of the steam turbine impellers.

Preferably, the adjusting assembly includes a toothed ring, the toothed ring is fixedly connected to a side wall of the mounting slip ring in the second clamping plate, and a supporting shaft rotatably penetrates a side wall of the groove in the second clamping plate, and one end of the supporting shaft is fixedly connected with a driving gear, the driving gear is meshed with the toothed ring, and an other end of the supporting shaft is fixedly provided with an adjusting handle.

Preferably, the detection mechanism includes a second electric telescopic rod, a fixed end of the second electric telescopic rod is fixedly connected to the top of the mounting bracket, and a telescopic end of the second electric telescopic rod is hinged with a connecting rod, a lower end of the connecting rod is fixedly connected with a mounting frame, electromagnets are respectively embedded in front and rear inner walls of the mounting frame, and two first iron fixing plates are fixedly connected to an inner wall of the mounting frame symmetrically back and forth through multiple first springs, left and right sides of the first iron fixing plate are fixedly provided with limit rods, and inner side walls of the two first iron fixing plates are respectively fixedly provided with first detectors.

Preferably, the device further includes a blade auxiliary detection mechanism, where the blade auxiliary detection mechanism is arranged on a left side wall of the mounting plate, the blade auxiliary detection mechanism includes a drive box, and a side wall of the drive box is fixedly connected to a left side wall of the mounting plate, a servo motor is fixedly connected to an inner wall of the drive box, and an output shaft of the servo motor is fixedly connected with a second threaded rod, one end of the second threaded rod is rotatably connected to the inner wall of the drive box, and a carriage is threadedly connected to the second threaded rod, a second fixing plate is fixedly connected to a top of the carriage and the second fixing plate is slidably connected in a chute at a top of the drive box, and a first housing is slidably connected in the chute at the top of the drive box through a third fixing plate, and the second threaded rod penetrates through two side walls of the first housing, and a connecting assembly is arranged in the first housing; two fixing assemblies are rotatably connected to inner walls of the second fixing plate and the third fixing plate respectively; and a second detector is fixedly installed on the top of the drive box through a fixing bracket.

Preferably, the connecting assembly includes a fixing sleeve, a top of the fixing sleeve is fixedly connected to a top in the first housing, and a threaded block is fixedly connected to a top in the fixing sleeve through a second spring, and a side wall of the threaded block is slidably connected with an inner wall of the fixing sleeve; a bottom of the threaded block is threadedly connected with the second threaded rod; a threaded adjusting rod is threadedly connected with the third fixing plate; and a lower end of the threaded adjusting rod penetrates through the third fixing plate and is fixedly connected with an ejector rod, and a lower end of the ejector rod slidably penetrates through the top of the first housing and contacts with a top of the threaded block.

Compared with the prior art, the detection device for steam turbine blades provided by the disclosure has the following beneficial effects:

The above-mentioned detection device for steam turbine blades may quickly fix the whole steam turbine impeller by matching the additional driving mechanism and the clamping mechanism, and detect all blades on the impeller at the same time, which is simple and convenient to operate and effectively improves the stability and accuracy of blade detection.

When the detection device for steam turbine blades detects the blades through the detection device, the time of replacing the blades to be detected one by one is saved, and the blades being detected stably and efficiently is ensured, which is convenient and fast, and effectively improves the working efficiency of detection.

BRIEF DESCRIPTION OF THE DRAWINGS

In order to explain the technical scheme of the disclosure or the prior art more clearly, the drawings needed to be used in the description of the embodiments or the prior art will be briefly introduced below. Obviously, the drawings in the following description are some embodiments of the disclosure, and other drawings can be obtained according to these drawings without creative efforts for ordinary skilled in the field.

Figure 1:
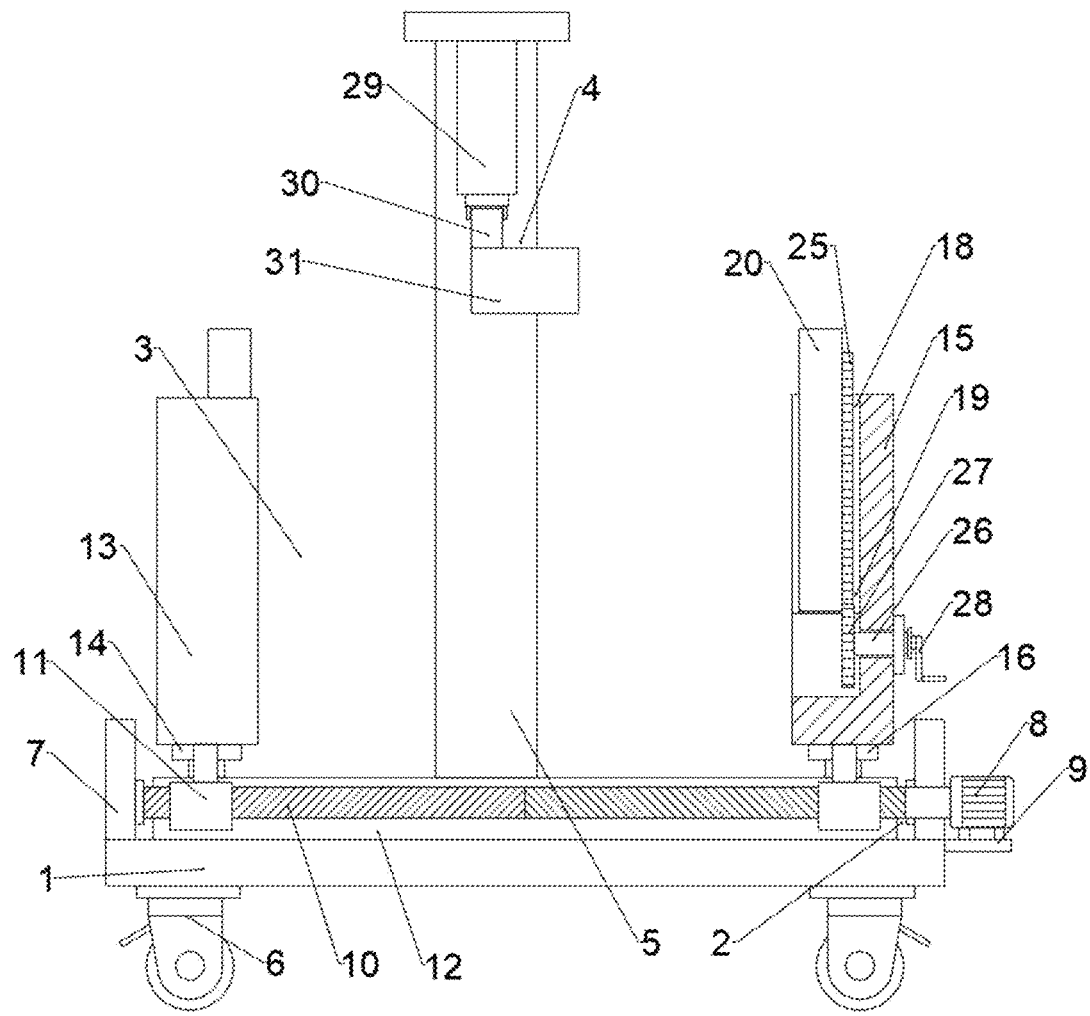
FIG. 1 is a schematic structural diagram of a detection device for steam turbine blades according to an embodiment of the disclosure.
Figure 2:
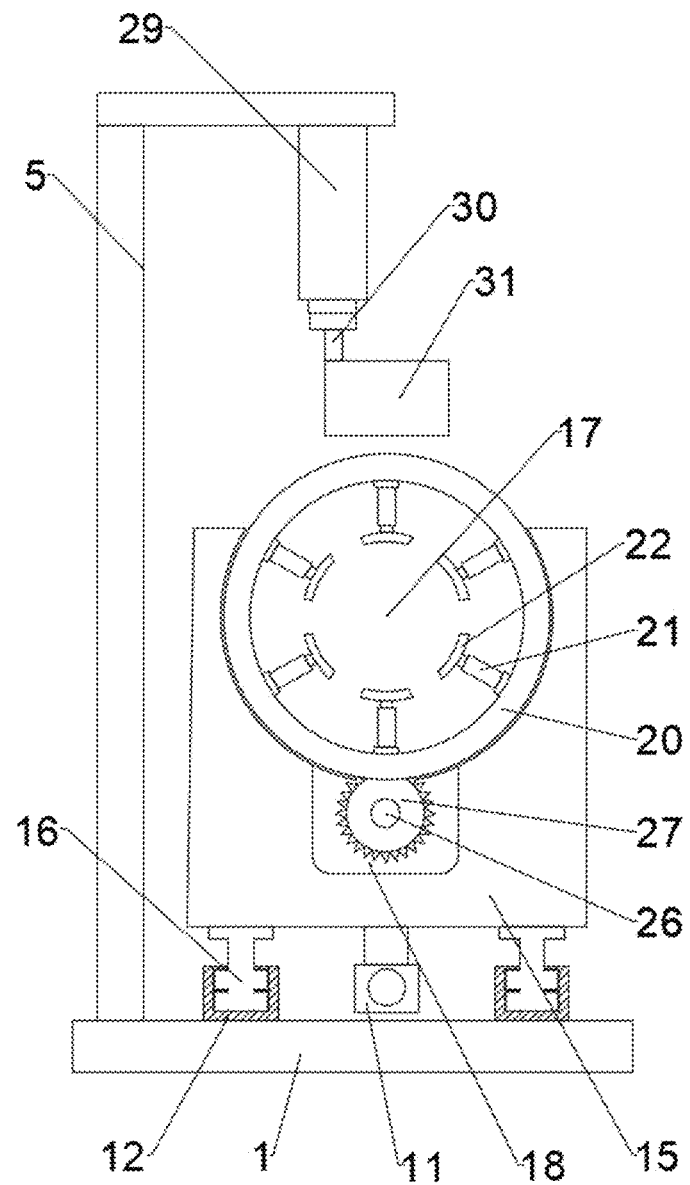
FIG. 2 is a schematic structural diagram of the detection device for steam turbine blades in a right side view according to an embodiment of the disclosure.

List of reference characters: 1 mounting plate; 2 driving mechanism; 3 clamping mechanism; 4 detection mechanism; 5 mounting bracket; 6 universal wheel; 7 supporting plate; 8 forward and reverse driving motor; 9 mounting seat; 10 first threaded rod; 11 threaded sliding sleeve; 12 slide rail; 13 first clamping plate; 14 first slider; 15 second clamping plate; 16 second slider; 17 clamping assembly; 18 groove; 19 adjusting assembly; 20 mounting slip ring; 21 first electric telescopic rod; 22 arc plate; 23 impeller; 24 first rotating shaft; 25 toothed ring; 26 supporting shaft; 27 driving gear; 28 adjusting handle; 29 second electric telescopic rod; 30 connecting rod; 31 mounting frame; 32 electromagnet; 33 first iron fixing plate; 34 first spring; 35 limit rod; 36 first detector; 37 blade auxiliary detection mechanism; 38 drive box; 39 servo motor; 40 second threaded rod; 41 carriage; 42 second fixing plate; 43 chute; 44 first housing; 45 third fixing plate; 46 connecting assembly; 47 fixing assembly; 48 second detector; 49 fixing bracket; 50 fixing sleeve; 51 threaded block; 52 second spring; 53 threaded adjusting rod; 54 ejector rod; 55 second housing; 56 driving motor; 57 third threaded rod; 58 upper pressing plate; 59 threaded sleeve; 60 lower pressing plate; 61 second rotating shaft; 62 drive handwheel; and 63 third electric telescopic rod.

DETAILED DESCRIPTION OF THE EMBODIMENTS

In order to make the purpose, technical scheme and advantages of the disclosure more clear, the technical scheme in the disclosure will be described clearly and completely with reference to the attached drawings of the disclosure. Obviously, the described embodiment is a part of the embodiment of the disclosure, but not all of embodiments. Based on the embodiments in the disclosure, all other embodiments obtained by ordinary skilled in the field without creative efforts belong to the scope of protection of the disclosure.

The following embodiments are provided.

Embodiment 1

A detection device for steam turbine blades is provided, as shown in FIGS. 1-4, includes a mounting plate 1, where a driving mechanism 2 is fixedly mounted on a top of the mounting plate 1, a clamping mechanism 3 is fixedly mounted on the driving mechanism 2, and a detection mechanism 4 is mounted on one side of the top of the mounting plate 1 through a mounting bracket 5.

Preferably, multiple universal wheels 6 are fixedly installed on a peripheral side of a bottom of the mounting plate 1.

Preferably, the driving mechanism 2 includes two supporting plates 7, the two supporting plates 7 are respectively fixedly connected to left and right sides of the top of the mounting plate 1, and a forward and reverse driving motor 8 is fixedly installed on a right side wall of the mounting plate 1 through a mounting seat 9, one end of a first threaded rod 10 with opposite left and right rotation directions rotatably penetrates the supporting plate 7 and is fixedly connected with an output shaft of the forward and reverse driving motor 8, and an other end of the first threaded rod 10 is rotatably connected with an inner wall, close to a left side of the mounting plate 1, of the supporting plate 7, and two threaded sliding sleeves 11 are threadedly connected on the first threaded rod 10 at left and right intervals, and the two threaded sliding sleeves 11 are threadedly connected on threaded sections with opposite rotation directions respectively.

Preferably, the clamping mechanism 3 includes two slide rails 12, the two slide rails 12 are fixedly installed at the top of the mounting plate 1 at front and rear intervals, and a bottom of a first clamping plate 13 is slidably connected to left sides of the two slide rails 12 through two first sliders 14, a bottom of a second clamping plate 15 is slidably connected to right sides of the two slide rails 12 through two second sliders 16; bottoms of the first clamping plate 13 and the second clamping plate 15 are fixedly connected with tops of the two threaded sliding sleeves 11 respectively in one-to-one correspondence; and two clamping assemblies 17 are respectively embedded in grooves 18 of the first clamping plate 13 and the second clamping plate 15, and an adjusting assembly 19 is arranged in a groove 18 of the second clamping plate 15, and the adjusting assembly 19 is used for driving a clamping assembly 17 in the second clamping plate 15.

Preferably, the clamping assembly 17 includes a mounting slip ring 20, the mounting slip ring 20 is rollingly connected in the groove 18 on the second clamping plate 15, fixed ends of multiple first electric telescopic rods 21 are fixedly connected along a circumferential interval of an inner wall of the mounting slip ring 20, and telescopic ends of multiple first electric telescopic rods 21 are fixedly connected with arc plates 22, and inner walls of the arc plates 22 are in contact connection with the first rotating shaft 24 of the steam turbine impellers 23.

The working principle and beneficial effects of the technical scheme are as follows.

The main structure of the detection device for steam turbine blades of the disclosure is provided with a mounting plate 1, a driving mechanism 2, a clamping mechanism 3, a mounting bracket 5 and a detection mechanism 4. The driving mechanism 2 installed on the mounting plate 1 drives the clamping mechanism 3 to fix the steam turbine impellers 23, and meanwhile, the blades to be detected on the steam turbine impellers 23 are detected one by one in cooperation with the detection mechanism 4 installed on the mounting plate 1 through the mounting bracket 5, thereby realizing reliable and convenient detection of the blades. The detection device for steam turbine blades is convenient to realize flexible movement of the detection device through multiple universal wheels 6 arranged at the peripheral side of the bottom of the mounting plate 1, and may be suitable for different working positions and detection environments. And secondly, the first threaded rod 10 can realize forward rotation and reverse rotation through the arranged driving mechanism 2 driven by the forward and reverse driving motors 8 installed on the mounting seat 9. Meanwhile, the two threaded sliding sleeves 11 threaded on the first threaded rod 10 with opposite forward and reverse rotation directions move inward or outward, so as to drive the clamping mechanism 3 to quickly fix the whole impellers 23 when detecting steam turbine blades, and the operation is convenient, so as to adapt to the detection of blades with different specifications.

When the detection device for steam turbine blades 4 detects blades, the driving mechanism 2 drives the two threaded sliding sleeves 11 to move inward or outward, and the two slide rails 12 are fixedly installed at the top of the mounting plate 1 at front and rear intervals, while the first clamping plate 13 and the second clamping plate 15 are driven by the first slider 14 and the second slider 16, the first clamping plate 13 and the second clamping plate 15 are driven by the two threaded sliding sleeves 11 to move left and right along the two slide rails 12, and the clamping assemblies 17 move arranged on the first clamping plate 13 and the second clamping plate 15. When the blade to be detected is detected, the clamping assembly 17 located on the first clamping plate 13 and multiple first electric telescopic rods 21 fixedly connected along the circumferential interval of the inner wall of the mounting slip ring 20 drive the arc plate 22 to contract. So that there is enough space in the mounting slip ring 20 for fixing the impeller 23. One end of the first rotating shaft 24 on the impeller 23 is placed on the arc plate 22 inside the mounting slip ring 20. multiple first electric telescopic rods 21 drive the arc plate 22 to extend until the inner wall of the arc plate 22 is closely attached to the first rotating shaft 24, so that one side of the impeller 23 is fixed with the first clamping plate 13. At this time, the first clamping plate 13 slides inward along the slide rail 12, so that the clamping assembly 17 on the second clamping plate 15 gradually approaches the other side of the first rotating shaft 24 on the impeller 23. When the first clamping plate 13 and the second clamping plate 15 reach the designated position, the clamping assembly 17 on the second clamping plate 15 cooperates with the first clamping plate 13 to reliably fix the impeller 23 and ensure that the blades on the impeller 23 are in the position to be detected, and then cooperates with the adjusting assembly 19 and the detecting mechanism 4 to detect the blades on the impeller 23. Secondly, after the inspection is completed, it is only necessary to reset the clamping assembly 17 on the first clamping plate 13 or the second clamping plate 15, so that the first rotating shaft 24 of the impeller 23 is separated from the clamping assembly 17, and the first clamping plate 13 and the second clamping plate 15 are separated by the driving motor of the driving mechanism 2. At this time, it is only necessary for the operator to remove the impeller 23 from the clamping assembly 17 on one side, thus completing the convenient and efficient inspection of the blades on the impeller 23.

The driving mechanism 2 is matched with the clamping mechanism 3, so that the whole steam turbine impeller 23 can be quickly fixed, and all the blades to be detected on the impeller 23 can be detected at the same time, and the operation is simple and convenient, so that the stability and accuracy in the blade detection process are effectively improved, and the working efficiency of the detection device for steam turbine blades is effectively improved.

Embodiment 2

Figure 3:
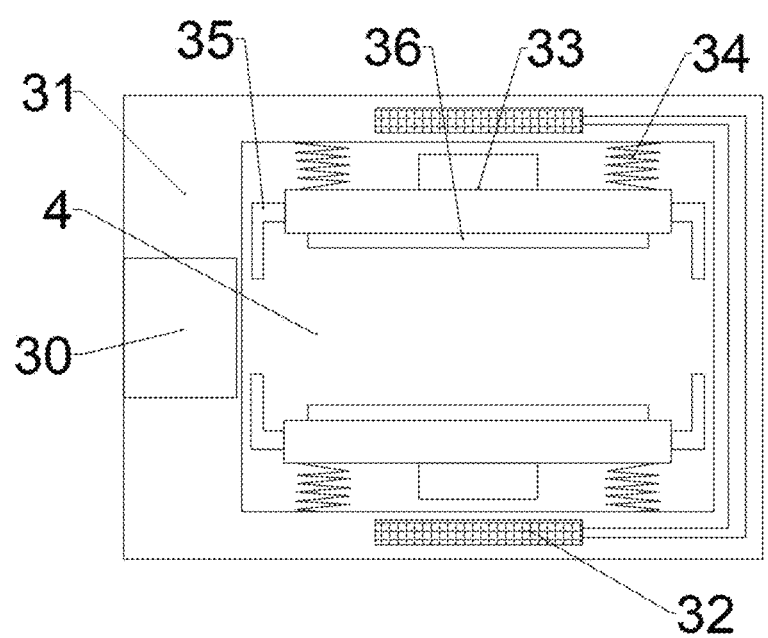
FIG. 3 is a schematic structural diagram of the detection mechanism in a top view according to an embodiment of the disclosure.
Figure 4:
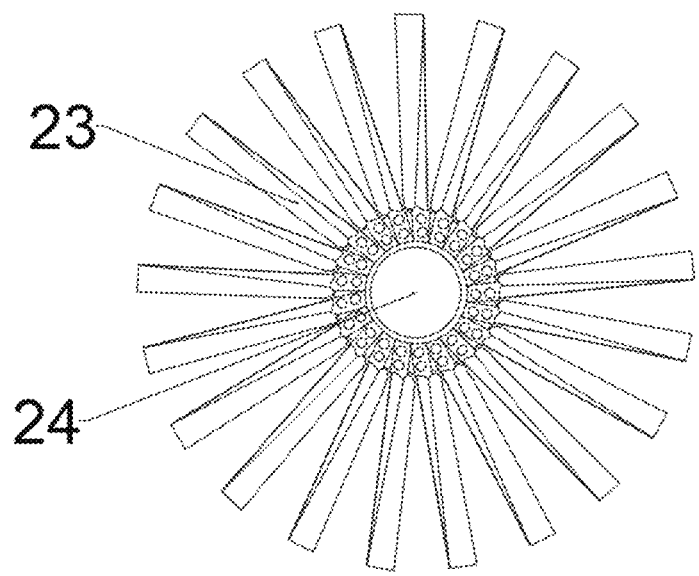
FIG. 4 is a schematic structural diagram of an impeller according to an embodiment of the disclosure.

On the basis of Embodiment 1, as shown in FIGS. 1 and 3-4, the adjusting assembly 19 includes a toothed ring 25. the toothed ring 25 is fixedly connected to a side wall of the mounting slip ring 20 in the second clamping plate 15, and a supporting shaft 26 rotatably penetrates a side wall of the groove 18 in the second clamping plate 15, and one end of the supporting shaft 26 is fixedly connected with a driving gear 27, the driving gear 27 is meshed with the toothed ring 25, and an other end of the supporting shaft 26 is fixedly provided with an adjusting handle 28.

Preferably, the detection mechanism 4 includes a second electric telescopic rod 29, a fixed end of the second electric telescopic rod 29 is fixedly connected to the top of the mounting bracket 5, and a telescopic end of the second electric telescopic rod 29 is hinged with a connecting rod 30, a lower end of the connecting rod 30 is fixedly connected with a mounting frame 31, electromagnets 32 are respectively embedded in front and rear inner walls of the mounting frame 31, and two first iron fixing plates 33 are fixedly connected to an inner wall of the mounting frame 31 symmetrically back and forth through multiple first springs 34, left and right sides of the first iron fixing plate 33 are fixedly provided with limit rods 35, and inner side walls of the two first iron fixing plates 33 are respectively fixedly provided with first detectors 36.

The working principle and beneficial effects of the above technical scheme are as follows.

The adjusting mechanism arranged in the detection device for steam turbine blades may be used to detect all the blades to be detected on the impeller 23 one by one, thus avoiding the time loss caused by replacing the blades to be detected one by one and reducing the working intensity of operators. When the detection mechanism starts to detect the blades on the impeller 23, the adjusting handle 28 is rotated to drive the supporting shaft 26 to rotate along the side wall of the second clamping plate 15, and meanwhile, the driving gear 27 fixedly connected to the supporting shaft 26 is rotated, and the driving gear 27 is engaged with the toothed ring 25 for transmission. So that the mounting slip ring 20 fixedly connected to the driving gear 27 rotates along the groove 18 of the second clamping plate 15. Because the impeller 23 is fixed by the clamping assemblies 17 on the first clamping plate 13 and the second clamping plate 15, the position of the blades to be detected on the impeller 23 can be replaced one by one by rotating the adjusting handle 28, thus well cooperating with the detection mechanism 4 to detect each blade to be detected. Then, when the blade to be detected is located at the detection position, the second electric telescopic rod in the detection mechanism 4 retracts and drives the mounting frame 31 to move up and down. At this time, the electromagnets 32 located on the inner walls of both sides of the mounting frame 31 move, and then two first iron fixing plates 33 fixedly connected to the inner walls of the mounting frame 31 symmetrically back and forth through multiple first springs 34 are attracted by the electromagnets 32, so that the space in the mounting frame 31 is expanded. It can better realize that the blade enters the mounting frame 31 to detect the blade. When the upper end of the blade completely enters the mounting frame 31, the electromagnet 32 is powered off at this time, and the two first iron fixing plates 33 are brought close to each other by the elastic force of the first spring 34, so that the first detector 36 fixedly installed on the first iron fixing plate 33 can be close to the surface of the blade to be detected, so as to detect. At the same time, the limit rods 35 fixedly installed on both sides of the two first iron fixing plates 33 can provide a good buffer for the first spring 34, so as to prevent the first detector 36 from being too close to the blade surface, thus causing the damage of the first detector 36, and at the same time, ensure the accuracy of the blade detection by the first detector 36. When the detection of the current blade is completed, the electromagnets 32 are energized, so that the two first iron fixing plates 33 approach the inner walls of both sides of the mounting frame 31, then the second electric telescopic rod 29 drives the mounting frame 31 to separate from the detected blade to complete the detection of a single blade. Then the adjusting handle 28 is rotated to make the next blade to be detected at the detection position, and the detection mechanism 4 completes the detection of the next blade. Where, the first detector 36 may be an ultrasonic detector, which uses the propagation characteristics of ultrasonic waves in the medium to detect the defects inside the blade, and is suitable for detecting the cracks, inclusions and other defects inside the blade. It has the advantages of non-contact, no damage, high detection speed and so on, and is widely used in nondestructive detection of steam turbine blades, so that the integrity and performance of the blade can be accurately judged.

By matching the adjusting mechanism with the detection mechanism 4 in the detection device for steam turbine blades, not only the time for replacing the blades to be detected one by one is saved, but also the stable and efficient detection of the blades can be ensured, which is not only convenient and fast, but also effectively ensures the working efficiency of the detection device for steam turbine blades.

Embodiment 3

Figure 5:
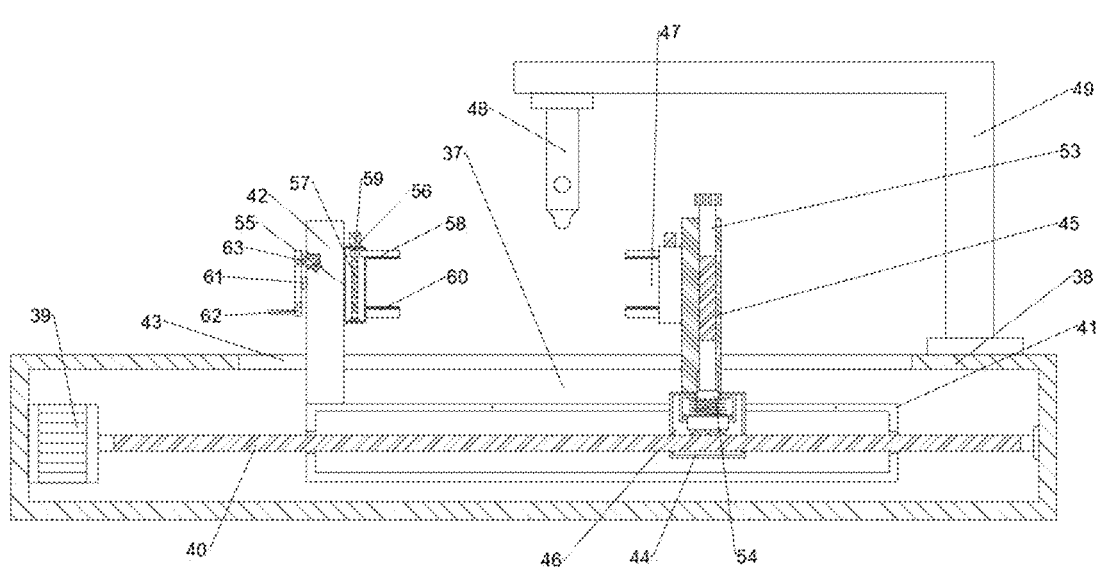
FIG. 5 is a a schematic structural diagram of the blade auxiliary detection mechanism in a left view according to an embodiment of the disclosure.
Figure 6:
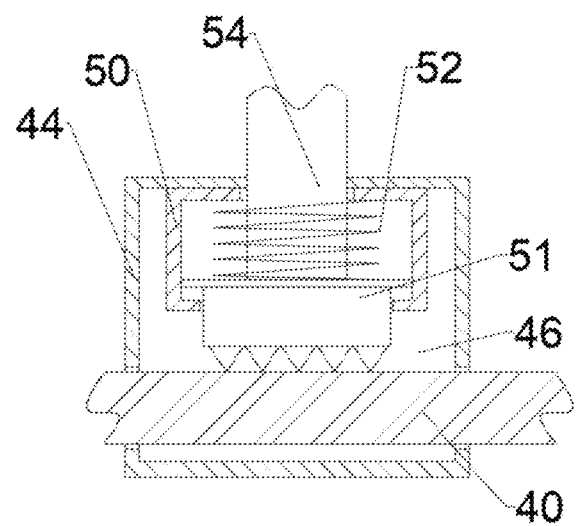
FIG. 6 is a schematic structural diagram of the connection between the connecting assembly and the second threaded rod according to an embodiment of the disclosure.

On the basis of Embodiment 1 or 2, as shown in FIGS. 5-6, the detection device further includes a blade auxiliary detection mechanism 37, the blade auxiliary detection mechanism 37 is arranged on a left side wall of the mounting plate 1, the blade auxiliary detection mechanism 37 includes a drive box 38, and a side wall of the drive box 38 is fixedly connected to a left side wall of the mounting plate 1, a servo motor 39 is fixedly connected to an inner wall of the drive box 38, and an output shaft of the servo motor 39 is fixedly connected with a second threaded rod 40, one end of the second threaded rod 40 is rotatably connected to the inner wall of the drive box 38, and a carriage 41 is threadedly connected to the second threaded rod 40, a second fixing plate 42 is fixedly connected to a top of the carriage 41 and the second fixing plate 42 is slidably connected in a chute 43 at a top of the drive box 38, and a first housing 44 is slidably connected in the chute 43 at the top of the drive box 38 through a third fixing plate 45, and the second threaded rod 40 penetrates through two side walls of the first housing 44, and a connecting assembly 46 is arranged in the first housing 44; two fixing assemblies 47 are rotatably connected to inner walls of the second fixing plate 42 and the third fixing plate 45 respectively; and a second detector 48 is fixedly installed on the top of the drive box 38 through a fixing bracket 49.

Preferably the connecting assembly 46 includes a fixing sleeve 50, a top of the fixing sleeve 50 is fixedly connected to a top in the first housing 44, and a threaded block 51 is fixedly connected to a top in the fixing sleeve 50 through a second spring 52, and a side wall of the threaded block 51 is slidably connected with an inner wall of the fixing sleeve 50; a bottom of the threaded block 51 is threadedly connected with the second threaded rod 40; a threaded adjusting rod 53 is threadedly connected with the third fixing plate 45; and a lower end of the threaded adjusting rod 53 penetrates through the third fixing plate 45 and is fixedly connected with an ejector rod 54, and a lower end of the ejector rod 54 slidably penetrates through the top of the first housing 44 and contacts with a top of the threaded block 51.

Preferably, the fixing assembly 47 includes a second housing 55, the second housing 55 is fixedly connected to the inner side wall of the second fixing plate 42 through a second rotating shaft 61, and the top of the second housing 55 is fixedly connected with a driving motor 56, and both ends of a third threaded rod 57 are respectively connected with the output shaft of the driving motor 56 and the bottom in the second housing 55, and an upper pressing plate 58 is threadedly connected onto the third threaded rod 57 through a threaded sleeve 59. One side of the lower pressing plate 60 is fixedly installed at the lower part of the outer side wall of the second housing 55, one end of the second rotating shaft 61 is fixedly installed with a driving handwheel 62, and the third electric telescopic rod 63 is embedded in the side wall of the second fixing plate 42.

The working principle and beneficial effects of the above technical scheme are as follows.

By arranging the blade auxiliary detection mechanism 37 on the detection device for steam turbine blades, the blades on the impeller 23 can be detected more accurately and efficiently, and it is avoided that the detection and evaluation of the blades in a certain special specification or state cannot be completed, thus affecting the use of the whole steam turbine blade. When the blade auxiliary detection mechanism 37 works, the servo motor 39 arranged on the inner wall of the drive box 38 starts to work to drive the fixedly connected third threaded rod 57 to rotate synchronously. At this time, the rotation of the third threaded rod 57 can realize that the threaded carriage 41 slides along the chute 43 at the top of the drive box 38 under the action of the second fixing plate 42 and the third fixing plate 45. With the clockwise rotation of the servo motor 39, firstly, the threaded adjusting rod 53 threadedly connected on the third fixing plate 45 is rotated downwards, and with the continuous downward movement of the threaded adjusting rod 53, the ejector rod 54 at the bottom of the threaded adjusting rod 53 is driven to move downwards synchronously, until the bottom of the ejector rod 54 contacts the top of the threaded block 51, so that the bottom of the threaded block 51 is engaged with the second threaded rod 40 for transmission. At this time, the first housing 44 moves left and right under the action of the fixing sleeve 50 and the threaded block 51, so as to complete the adjustment of the horizontal distance between the second fixing plate 42 and the third fixing plate 45. When the positions of the second fixing plate 42 and the third fixing plate 45 are adjusted, the threaded adjusting lever 53 is rotated upward, and at this time, the threaded adjusting lever 53 drives the ejector rod 54 to move upward along the top of the fixing sleeve 50. At this time, the bottom of the ejector rod 54 is out of contact with the top of the threaded block 51, and the second spring 52 contracts. Under the elastic force of the second spring 52, the bottom of the threaded block 51 is disengaged from the second threaded rod 40. At this time, with the rotation of the second threaded rod 40, the left-right movement of the carriage 41 can be completed. At the same time, the second fixing plate 42 and the third fixing plate 45 located at the top of the carriage 41 cooperate with the fixing assembly 47 to realize the left-right movement of the blade to be detected, thus cooperating with the second detector 48 on the blade auxiliary detection mechanism 37 to finely detect various positions on the surface of the blade to be detected. At the same time, the fixing assembly 47 located on the second fixing plate 42 is driven by the driving motor 56 to drive the third threaded rod 57 to rotate in the second housing 55. At this time, the upper pressing plate 58 threadedly connected on the third threaded rod 57 through the threaded sleeve 59 can rotate up and down. As the upper pressing plate 58 and the lower pressing plate 60 get closer to each other to fix one end of the blade, the positions of the second fixing plate 42 and the third fixing plate 45 are close to each other. The fixing assembly 47 located on the third fixing plate 45 fixes the other end of the blade to be detected, thus realizing the reliable fixing of the blade to be detected on the blade auxiliary detection mechanism 37, better satisfying the fine detection of different positions of the detected blade, and ensuring the reliability of the auxiliary transfer device.

The blade to be detected is quickly and conveniently installed and fixed on the detection mechanism 4 through the fixing assembly 47 provided by the blade auxiliary detection mechanism 37. Because the second housing 55 of the fixing assembly 47 is connected with the inner walls of the second fixing plate 42 and the third fixing plate 45 through the second rotating shaft 61, when the driving handwheel 62 fixedly installed at one end of the second rotating shaft 61 needs to realize the forward and backward rotation of the blade to be detected in the horizontal direction, the driving handwheel 62 drives the second rotating shaft 61 to rotate, which realizes the rotation of the fixing assembly 47 on the second fixing plate 42. At the same time, it cooperates with the fixed assembly 47 on the third fixing plate 45 to complete the forward and backward rotation of the blade to be detected in the horizontal direction, so that it can better cooperate with the second detector 48 to detect the blade surface in all directions and at multiple angles. Secondly, the third electric telescopic rod 63 embedded in the side wall of the second fixing plate 42 extends and retracts, so that every time the driving handwheel 62 rotates a detection position, the telescopic end of the third electric telescopic rod 63 cooperates with the groove of the driving handwheel 62 to stop, thus realizing the refinement and reliability detection of the blades, which satisfies the refinement detection and evaluation of the blades in different specifications and states by the detection device for steam turbine blades, greatly reduces the working intensity of workers, ensures the detection efficiency of the detection device for steam turbine blades, and effectively improves the stability and reliability of the detection of the detection device for steam turbine blades.

Embodiment 4

On the basis of Embodiment 1 or 2, the detection device for steam turbine blades further includes a blade performance detection device for detecting working state of blades during working process of steam turbine impellers 23, where the blade performance detection device includes:
  a rotation speed sensor, used for detecting rotation speed of a first rotating shaft 24 connected with the steam turbine impellers 23;
  a vortex flowmeter, used for detecting steam flow passing through the steam turbine impellers 23;
  a first wind speed sensor, used for detecting conveying speed of steam flow before passing through the steam turbine impellers 23;
  a second wind speed sensor, used for detecting flow speed of steam flow after passing through the steam turbine impellers 23; and
  a controller and an alarm, where the controller is electrically connected with the rotation speed sensor, the vortex flowmeter, the first wind speed sensor, the second wind speed sensor and the alarm, and the controller controls the alarm to work based on the rotation speed sensor, the vortex flowmeter, the first wind speed sensor and the second wind speed sensor;
  Preferably, the controller controls the alarm to alarm based on the rotation speed sensor, the vortex flowmeter, the first wind speed sensor and the second wind speed sensor, and including:
  according to following formula, detection values are obtained by the rotation speed sensor, the vortex flowmeter, the first wind speed sensor and the second wind speed sensor, a blade working state evaluation coefficient W of the steam turbine impellers in working process is calculated, the controller compares a blade working state evaluation coefficient W of the steam turbine impellers in current working process with a preset blade working state evaluation coefficient range, and if the blade working state evaluation coefficient W of the steam turbine impellers in current working process is not in the preset blade working state evaluation coefficient range, the controller controls the alarm to alarm:

$$W = 1 - \Phi\left\{\frac{2 \times G \times (1+v)}{\sqrt{\left[\frac{\rho \times S_1 \times (2 \times \pi \times n)^2 \times L}{3600 \times g \times s_0}\right]^2 + \left[\frac{J \times (V_1 + V_2)}{g \times \delta \times N \times s_0}\right]^2}}\right\};$$

where, W is a blade working state evaluation coefficient of the steam turbine impellers in working progress, $$\frac{2 \times G \times (1+v)}{\sqrt{\left[\frac{\rho \times S_1 \times (2 \times \pi \times n)^2 \times L}{3600 \times g \times s_0}\right]^2 + \left[\frac{J \times (V_1 + V_2)}{g \times \delta \times N \times s_0}\right]^2}}$$

is a reliability index of steam impellers in working process, turbine blade running state, $\Phi(*)$ is a function corresponding to the reliability index of the steam turbine blade running state, $\rho$ is material density of each of steam turbine blades, $S_1$ is effective cross-sectional area of the steam turbine blade, n is a detection value of the first rotating shaft 24 connected with the steam turbine impellers 23 by the rotation speed sensor, L is a actual height of working part of each of the steam turbine blades, g is a gravitational acceleration the value is 9.81 m/s², $S_0$ is a unilateral surface area of the steam turbine blade, and J is a detection value of steam flow passing through the steam turbine impellers 23 by the vortex flowmeter, $\delta$ is a partial admission steam degree of the steam turbine when entering steam, N is a number of blades on the steam turbine impellers 23, $V_1$ is a detection value of the first wind speed sensor for steam flow conveying speed before passing through the steam turbine impellers 23, $V_2$ is a detection value of the second wind speed sensor for steam flow flow speed after passing through the steam turbine impellers 23, G is shear modulus of steam turbine blade material, and v is Poisson's ratio of the steam turbine blade material.

The technical scheme has the advantages that: according to the detection values of the rotation speed sensor, the vortex flowmeter, the first wind speed sensor and the second wind speed sensor, comprehensively considering the material density of the steam turbine blade and the actual height of the working part, the effective cross-sectional area of the steam turbine blade, the rotation speed of the first rotating shaft 24 to which the steam turbine impeller 23 is connected, the unilateral surface area of the steam turbine blade, the steam flow through the steam turbine impeller 23, the partial admission steam degree of the steam turbine when entering steam, the number of blades on the steam turbine impellers 23, the steam flow conveying speed before and after the steam turbine impellers 23, the shear modulus of steam turbine blade material and the Poisson's ratio of the steam turbine blade material, the blade working state evaluation coefficient W of the steam turbine impellers in working process is calculated, which makes the calculation result more accurate and reliable.

The controller controls the rotation speed sensor, vortex flowmeter, first wind speed sensor, second wind speed sensor and the alarm to work. When the actual blade working condition evaluation coefficient W is not within the preset blade working condition evaluation coefficient range, the controller controls the alarm to alarm, so as to remind workers to check the steam turbine blades in time, and maintain the steam turbine blades according to the actual inspection results to maintain the normal working conditions of the steam turbine blades. The service life of steam turbine blades is effectively prolonged, and the use requirements of steam turbine blades for operation reliability and stability are further met. By monitoring the working state of steam turbine blades in real time, not only the detection efficiency of steam turbine blades is increased, but also the safe operation of steam turbine is guaranteed.

Finally, it should be explained that the above embodiments are only used to illustrate the technical scheme of the disclosure, but not to limit it. Although the disclosure has been described in detail with reference to the foregoing embodiments, those skilled in the art should understand that it is still possible to amend the technical scheme described in the foregoing embodiments, or to replace some technical features with equivalents. However, these amendments or substitutions do not make the essence of the corresponding technical solutions deviate from the spirit and scope of the technical solutions of various embodiments of the disclosure.

What is claimed is:

1. A detection device for steam turbine blades, comprising a mounting plate, wherein a driving mechanism is fixedly mounted on a top of the mounting plate, a clamping mechanism is fixedly mounted on the driving mechanism, and a detection mechanism is mounted on one side of the top of the mounting plate through a mounting bracket;
   a blade performance detection device, used for detecting working state of blades during working process of steam turbine impellers, wherein the blade performance detection device comprises:
   a rotation speed sensor, used for detecting rotation speed of a first rotating shaft connected with the steam turbine impellers;
   a vortex flowmeter, used for detecting steam flow passing through the steam turbine impellers;
   a first wind speed sensor, used for detecting conveying speed of steam flow before passing through the steam turbine impellers;
   a second wind speed sensor, used for detecting flow speed of steam flow after passing through the steam turbine impellers; and
   a controller and an alarm, wherein the controller is electrically connected with the rotation speed sensor, the vortex flowmeter, the first wind speed sensor, the second wind speed sensor and the alarm, and the controller controls the alarm to work based on the rotation speed sensor, the vortex flowmeter, the first wind speed sensor and the second wind speed sensor;
   the controller controls the alarm to alarm based on the rotation speed sensor, the vortex flowmeter, the first wind speed sensor and the second wind speed sensor, and comprising:
   according to following formula, detection values are obtained by the rotation speed sensor, the vortex flowmeter, the first wind speed sensor and the second wind speed sensor, a blade working state evaluation coefficient W of the steam turbine impellers in working process is calculated, the controller compares a blade working state evaluation coefficient W of the steam turbine impellers in current working process with a preset blade working state evaluation coefficient range, and if the blade working state evaluation coefficient W of the steam turbine impellers in current working process is not in the preset blade working state evaluation coefficient range, the controller controls the alarm to alarm;

$$W = 1 - \Phi \left\{ \frac{2 \times G \times (1+v)}{\sqrt{\left[\frac{\rho \times S_1 \times (2 \times \pi \times n)^2 \times L}{3600 \times g \times s_0}\right]^2 + \left[\frac{J \times (V_1 + V_2)}{g \times \delta \times N \times s_0}\right]^2}} \right\};$$

wherein, W is a blade working state evaluation coefficient of the steam turbine impellers in working process, $$\frac{2 \times G \times (1+v)}{\sqrt{\left[\frac{\rho \times S_1 \times (2 \times \pi \times n)^2 \times L}{3600 \times g \times s_0}\right]^2 + \left[\frac{J \times (V_1 + V_2)}{g \times \delta \times N \times s_0}\right]^2}}$$

is a reliability index of steam turbine blade running state, $\Phi(*)$ is a function corresponding to the reliability index of the steam turbine blade running state, $\rho$ is material density of each of steam turbine blades, $S_1$ is effective cross-sectional area of the steam turbine blade, n is a detection value of the first rotating shaft connected with the steam turbine impellers by the rotation speed sensor, L is a actual height of working part of each of the steam turbine blades, g is a gravitational acceleration, $S_0$ is a unilateral surface area of the steam turbine blade, and J is a detection value of steam flow passing through the steam turbine impellers by the vortex flowmeter, $\delta$ is a partial admission steam degree of the steam turbine when entering steam, N is a number of blades on the steam turbine impellers, $V_1$ is a detection value of the first wind speed sensor for steam flow conveying speed before passing through the steam turbine impellers, $V_2$ is a detection value of the second wind speed sensor for steam flow flow speed after passing through the steam turbine impellers, G is shear modulus of steam turbine blade material, and v is Poisson's ratio of the steam turbine blade material.

2. The detection device for steam turbine blades according to claim 1, wherein a plurality of universal wheels are fixedly installed on a peripheral side of a bottom of the mounting plate.

3. The detection device for steam turbine blades according to claim 1, wherein the driving mechanism comprises two supporting plates, the two supporting plates are respectively fixedly connected to left and right sides of the top of the mounting plate, and a forward and reverse driving motor is fixedly installed on a right side wall of the mounting plate through a mounting seat, one end of a first threaded rod with opposite left and right rotation directions rotatably penetrates the supporting plate and is fixedly connected with an output shaft of the forward and reverse driving motor, and an other end of the first threaded rod is rotatably connected with an inner wall, close to a left side of the mounting plate, of the supporting plate, and two threaded sliding sleeves are threadedly connected on the first threaded rod at left and right intervals, and the two threaded sliding sleeves are threadedly connected on threaded sections with opposite rotation directions respectively.

4. The detection device for steam turbine blades according to claim 1, wherein the detection mechanism comprises a second electric telescopic rod, a fixed end of the second electric telescopic rod is fixedly connected to the top of the mounting bracket, and a telescopic end of the second electric telescopic rod is hinged with a connecting rod, a lower end of the connecting rod is fixedly connected with a mounting frame, electromagnets are respectively embedded in front and rear inner walls of the mounting frame, and two first iron fixing plates are fixedly connected to an inner wall of the mounting frame symmetrically back and forth through a plurality of first springs, left and right sides of the first iron fixing plate are fixedly provided with limit rods, and inner side walls of the two first iron fixing plates are respectively fixedly provided with first detectors.

5. The detection device for steam turbine blades according to claim 1, further comprising a blade auxiliary detection mechanism, wherein the blade auxiliary detection mechanism is arranged on a left side wall of the mounting plate, the blade auxiliary detection mechanism comprises a drive box, and a side wall of the drive box is fixedly connected to a left side wall of the mounting plate, a servo motor is fixedly connected to an inner wall of the drive box, and an output shaft of the servo motor is fixedly connected with a second threaded rod, one end of the second threaded rod is rotatably connected to the inner wall of the drive box, and a carriage is threadedly connected to the second threaded rod, a second fixing plate is fixedly connected to a top of the carriage and the second fixing plate is slidably connected in a chute at a top of the drive box, and a first housing is slidably connected in the chute at the top of the drive box through a third fixing plate, and the second threaded rod penetrates through two side walls of the first housing, and a connecting assembly is arranged in the first housing; two fixing assemblies are rotatably connected to inner walls of the second fixing plate and the third fixing plate respectively; and a second detector is fixedly installed on the top of the drive box through a fixing bracket.

6. The detection device for steam turbine blades according to claim 5, wherein the connecting assembly comprises a fixing sleeve, a top of the fixing sleeve is fixedly connected to a top in the first housing, and a threaded block is fixedly connected to a top in the fixing sleeve through a second spring, and a side wall of the threaded block is slidably connected with an inner wall of the fixing sleeve; a bottom of the threaded block is threadedly connected with the second threaded rod; a threaded adjusting rod is threadedly connected with the third fixing plate; and a lower end of the threaded adjusting rod penetrates through the third fixing plate and is fixedly connected with an ejector rod, and a lower end of the ejector rod slidably penetrates through the top of the first housing and contacts with a top of the threaded block.

7. The detection device for steam turbine blades according to claim 1, wherein the clamping mechanism comprises two slide rails, the two slide rails are fixedly installed at the top of the mounting plate at front and rear intervals, and a bottom of a first clamping plate is slidably connected to left sides of the two slide rails through two first sliders, a bottom of a second clamping plate is slidably connected to right sides of the two slide rails through two second sliders; bottoms of the first clamping plate and the second clamping plate are fixedly connected with tops of the two threaded sliding sleeves respectively in one-to-one correspondence; and two clamping assemblies are respectively embedded in grooves of the first clamping plate and the second clamping plate, and an adjusting assembly is arranged in a groove of the second clamping plate, and the adjusting assembly is used for driving a clamping assembly in the second clamping plate.

8. The detection device for steam turbine blades according to claim 7, wherein the clamping assembly comprises a mounting slip ring, the mounting slip ring is rollingly connected in the groove on the second clamping plate, fixed ends of a plurality of first electric telescopic rods are fixedly connected along a circumferential interval of an inner wall of the mounting slip ring, and telescopic ends of the plurality of first electric telescopic rods are fixedly connected with arc plates, and inner walls of the arc plates are in contact connection with the first rotating shaft of the steam turbine impellers.

9. The detection device for steam turbine blades according to claim 8, wherein the adjusting assembly comprises a toothed ring, the toothed ring is fixedly connected to a side wall of the mounting slip ring in the second clamping plate, and a supporting shaft rotatably penetrates a side wall of the groove in the second clamping plate, and one end of the supporting shaft is fixedly connected with a driving gear, the driving gear is meshed with the toothed ring, and an other end of the supporting shaft is fixedly provided with an adjusting handle.

* * * * *